United States Patent
Blades et al.

(10) Patent No.: US 12,299,795 B2
(45) Date of Patent: May 13, 2025

(54) SYSTEM AND METHOD FOR GENERATING A VIRTUAL AVATAR

(71) Applicant: Orpyx Medical Technologies Inc., Calgary (CA)

(72) Inventors: Samuel Carl William Blades, Victoria (CA); Maryam Hajizadeh, Windsor (CA); Philippe Pasquier, Vancouver (CA)

(73) Assignee: Orpyx Medical Technologies Inc., Calgary (CA)

( * ) Notice: Subject to any disclaimer, the term of this patent is extended or adjusted under 35 U.S.C. 154(b) by 132 days.

(21) Appl. No.: 18/187,996

(22) Filed: Mar. 22, 2023

(65) Prior Publication Data
US 2023/0316620 A1   Oct. 5, 2023

Related U.S. Application Data

(60) Provisional application No. 63/324,929, filed on Mar. 29, 2022.

(51) Int. Cl.
*G06T 13/40* (2011.01)
(52) U.S. Cl.
CPC .......... *G06T 13/40* (2013.01); *G06T 2200/08* (2013.01)
(58) Field of Classification Search
None
See application file for complete search history.

(56) References Cited

U.S. PATENT DOCUMENTS

| | | |
|---|---|---|
| 7,588,516 B2 | 9/2009 | Couvillion, Jr. et al. |
| 7,981,057 B2 | 7/2011 | Stewart |
| 9,067,097 B2 | 6/2015 | Lane et al. |

(Continued)

FOREIGN PATENT DOCUMENTS

| | | |
|---|---|---|
| WO | 2018146546 A1 | 8/2018 |
| WO | 2021092676 A1 | 5/2021 |

OTHER PUBLICATIONS

Yang Zheng et al., Pedalvatar: An IMU-Based Real-Time Body Motion Capture System Using Foot Rooted Kinematic Model, 2014 IEEE/RSJ International Conference on Intelligent Robots and Systems, 2014, pp. 4130-4135, Chicago, IL, USA.

(Continued)

*Primary Examiner* — David H Chu
(74) *Attorney, Agent, or Firm* — ATMAC Patent Services Ltd.; Andrew T. MacMillan

(57) ABSTRACT

A system, method and computer program product for generating a virtual avatar representing a user. Sensor data is obtained from a plurality of sensors mounted to the user. The sensor data includes force sensor data from force sensors positioned underfoot of the user and IMU data from a plurality of inertial measurement units (IMUs) mounted at respective IMU locations on the user. An activity type is determined from the sensor data. An estimated full-body posture of the user is determined by inputting the IMU data, force sensor data, and activity type to a machine learning model trained to estimate full-body posture. The estimated full-body posture specifies a limb position and a limb orientation for each limb of the user. The virtual avatar is generated based on the estimated full-body posture and can be displayed. The virtual avatar can be generated without the use of motion capture sensors.

16 Claims, 4 Drawing Sheets

(56) References Cited

U.S. PATENT DOCUMENTS

| | | | |
|---|---|---|---|
| 9,526,983 | B2 | 12/2016 | Lin |
| 10,065,074 | B1 | 9/2018 | Hoang et al. |
| 10,139,914 | B2 | 11/2018 | Elangovan |
| 10,729,356 | B2 | 8/2020 | Nino et al. |
| 10,830,584 | B2 | 11/2020 | Boulkenafed et al. |
| 10,842,415 | B1 | 11/2020 | Jagannathan et al. |
| 11,007,406 | B2 | 5/2021 | Shah |
| 11,071,498 | B2 | 7/2021 | Connor |
| 11,526,749 | B2 | 12/2022 | Cheng et al. |
| 2010/0035688 | A1 | 2/2010 | Picunko |
| 2011/0009241 | A1* | 1/2011 | Lane .................. G06F 3/011 482/8 |
| 2013/0130843 | A1* | 5/2013 | Burroughs ............ H01Q 1/273 473/415 |
| 2014/0141881 | A1 | 5/2014 | Brick |
| 2018/0020978 | A1 | 1/2018 | Kaifosh et al. |
| 2020/0218365 | A1* | 7/2020 | Todorov ................ G06F 3/011 |
| 2020/0253320 | A1* | 8/2020 | Guard .................. A63F 13/245 |
| 2021/0007874 | A1* | 1/2021 | Galiana Bujanda .... A61F 5/028 |
| 2022/0030197 | A1* | 1/2022 | Ishimoto ................ G06T 13/40 |

OTHER PUBLICATIONS

Ashok Kumar Patil et al., An Open-Source Platform for Human Pose Estimation and Tracking Using a Heterogeneous Multi-Sensor System, Sensors, 2021, pp. 2340, 21(7).

Daniel Tik-Pui Fong et al., The Use of Wearable Inertial Motion Sensors in Human Limb Biomechanics Studies: A Systematic Review, Sensors, 2010, pp. 11556-11565, 10(12).

G.S. Faber et al., Validation of a wearable system for 3D ambulatory L5/S1 moment assessment during manual ifting using instrumented shoes and an inertial sensor suit, Journal of Biomechanics, 2020, pp. 109671, vol. 102.

Hyerim Lim et al., Prediction of Lower Limb Kinetics and Kinematics during Walking by a Single IMU on the Lower Back Using Machine Learning, Sensors, 2020, pp. 130, 20(1).

Qilong Yuan et al., Localization and velocity tracking of human via 3 IMU Sensors, Sensors and Actuators A: Physical, 2014, pp. 25-33, vol. 212.

Frank J. Wouda et al., Estimation of Vertical Ground Reaction Forces and Sagittal Knee Kinematics During Running Using Three Inertial Sensors, Frontiers in Physiology, 2018, 9(218).

Dimitar Stanev et al., Real-Time Musculoskeletal Kinematics and Dynamics Analysis Using Marker- and IMU-Based Solutions in Rehabilitation, Sensors, 2021, pp. 1804, 21(5).

M.-L. Mille et al., Are human anticipatory postural adjustments affected by a modification of the initial position of the center of gravity?, Neuroscience Letters, 1998, pp. 61-64, 242(2).

Sahil Narang et al., Simulating Movement Interactions between Avatars & Agents in Virtual Worlds using Human Motion Constraints, 2018 IEEE Conference on Virtual Reality and 3D User Interfaces, 2018, pp. 9-16, Tuebingen/Reutlingen, Germany.

Ari Shapiro, Building a Character Animation System, 2011, Motion in Games—4th International Conference, 2011, pp. 98-109.

Chonhyon Park et al., Simulating High-DOF Human-like Agents using Hierarchical Feedback Planner, Proceedings of the 21st ACM Symposium on Virtual Reality Software and Technology, 2015, pp. 153-162.

Rui Yuan et al., Construction of Virtual Video Scene and Its Visualization During Sports Training, IEEE Access, 2020, pp. 124999-125012, vol. 8.

Javier Gonzalez-Alonso et al., Custom IMU-Based Wearable System for Robust 2.4 GHz Wireless Human Body Parts Orientation Tracking and 3D Movement Visualization on an Avatar, Sensors, 2021, pp. 6642, 21(19).

G.S. Faber et al., Validation of a wearable system for 3D ambulatory L5/S1 moment assessment during manual lifting using instrumented shoes and an inertial sensor suit, Journal of Biomechanics, 2020, pp. 109671, vol. 102.

* cited by examiner

SYSTEM AND METHOD FOR GENERATING A VIRTUAL AVATAR

CROSS-REFERENCE TO RELATED APPLICATIONS

This application claims the benefit of priority of U.S. Provisional Application No. 63/324,929 filed Mar. 29, 2022, which is incorporated herein by reference.

FIELD

This document relates to systems and methods for processing data from sensors monitoring human movement or human activity. In particular, this document relates to generating a virtual avatar using force sensor data and inertial measurement data from an individual.

BACKGROUND

U.S. Pat. No. 10,830,584 describes a computer-implemented method for performing body posture tracking, comprising the steps of collecting depth measurements of a body with at least one depth sensor; collecting inertial measurements with at least one inertial sensor attached to the body; and determining at least one posture of the body as a function of the depth measurements and the inertial measurements.

U.S. Pat. No. 10,139,914 describes an apparatus and methods for reconstructing a full human skeletal pose or a partial skeletal pose by aggregating and fusing various data from various sensors, and for detecting the occurrence of gestures from poses that occur over a period of time.

SUMMARY

The following summary is intended to introduce the reader to various aspects of the detailed description, but not to define or delimit any invention.

A system, method and computer program product for generating a virtual avatar are provided. A plurality of sensors, including force sensors and inertial measurement sensors can be mounted at various locations on a user's body. The sensors can obtain readings while the user is performing various movements or activities. The sensor readings can be used to estimate the user's full-body posture. The estimated full-body posture can then be used to generate a virtual avatar representing the user's body. The virtual avatar can be generated without requiring the user to be monitored by motion capture cameras. This may allow the user to perform activities at various different locations while still generating a virtual avatar that accurately represents the user.

In some examples, the sensor readings can be analyzed to determine the type of activity in which the user is partaking. The sensor readings along with the determined activity type can be provided as inputs to a machine learning model trained to estimate a full-body posture. The estimated full-body posture output by the machine learning model can then be used to generate the user's virtual avatar.

According to some aspects, a method of generating a virtual avatar representing a user using sensor data from a plurality of sensors mounted to the user includes: obtaining sensor data from the plurality of sensors, wherein the sensor data includes: force sensor data from a plurality of force sensors positioned underfoot of the user; and IMU data from a plurality of inertial measurement units (IMUs) mounted at respective IMU locations on the user, wherein the IMU data includes a plurality of IMU datasets, and each IMU dataset corresponds to one of the IMU locations; determining an activity type from the sensor data; determining an estimated full-body posture of the user by inputting the IMU data, force sensor data, and activity type to a machine learning model trained to estimate full-body posture, wherein the estimated full-body posture specifies a limb position and a limb orientation for each limb of the user; generating the virtual avatar based on the estimated full-body posture; and displaying the virtual avatar.

Generating the virtual avatar can include determining a plurality of skeletal lines representing the limbs of the user based on the estimated full-body posture; and generating the virtual avatar from the plurality of skeletal lines.

Generating the virtual avatar from the plurality of skeletal lines can include generating an avatar base template from the plurality of skeletal lines; and scaling the avatar base template using anthropometric measurement data for the user to generate the virtual avatar.

The method can include determining motion of the limbs of the user based on limb velocity data and acceleration data from the IMU data.

The method can include moving the virtual avatar within a virtual environment in response to the motion of the limbs.

The plurality of IMUs can include a pair of foot-mounted IMUs, and the activity type can be determined based on the IMU datasets from the pair of foot-mounted IMUs.

The plurality of IMUs can include at most 10 IMUs.

The plurality of IMUs can include a pair of underfoot IMUs, a pair of wrist-mounted IMUs, a sacrum-mounted IMU, a trunk-mounted IMU, a pair of thigh-mounted IMUs, and a pair of shank-mounted IMUs.

The virtual avatar can be generated in the absence of any visual motion capture data.

The sensor data can consist entirely of sensor data collected from sensors mounted to the user's body.

The machine learning model can be trained using training data generated by collecting training sensor data and training motion capture data and calculating a training full-body posture using the training motion capture data.

The training sensor data and training motion capture data can be collected from one or more users while performing a plurality of specified activity types.

The training motion capture data from a given training user can be used to generate an initial training virtual avatar; and the initial training virtual avatar can be scaled using anthropometric measurement data for the given training user to generate a training virtual avatar.

The machine learning model can be trained by: calculating a training estimated full-body posture by inputting the training sensor data to the machine learning model; and optimizing the machine learning model based on a correlation between the training estimated full-body posture and the training full-body posture.

According to some aspects, a system for generating a virtual avatar representing a user includes a plurality of sensors mountable to the user, the plurality of sensors including a plurality of force sensors positionable underfoot of the user and a plurality of inertial measurement units (IMUs) mountable at respective IMU locations on the user; one or more processors communicatively coupled to the plurality of sensors; and a non-transitory storage memory storing a machine learning model trained to estimate a full-body posture of the user. The one or more processors are configured to: obtain sensor data from the plurality of sensors, wherein the sensor data includes: force sensor data from the plurality of force sensors; and IMU data from the plurality of inertial measurement units (IMUs), wherein the IMU data includes a plurality of IMU datasets, and each IMU dataset corresponds to one of the IMU locations; determine an activity type from the sensor data; determine an estimated full-body posture by inputting the IMU data, force sensor data, and activity type to the machine learning model, wherein the estimated full-body posture specifies a limb position and a limb orientation for each limb of the user; generate the virtual avatar based on the estimated full-body posture; and display the virtual avatar.

The one or more processors can be configured to generate the virtual avatar by: determining a plurality of skeletal lines representing the limbs of the user based on the estimated full-body posture; and generating the virtual avatar from the plurality of skeletal lines.

The one or more processors can be configured to generate the virtual avatar from the plurality of skeletal lines by: generating an avatar base template from the plurality of skeletal lines; and scaling the avatar base template using anthropometric measurement data for the user to generate the virtual avatar.

The one or more processors can be configured to determine motion of the limbs of the user based on limb velocity data and acceleration data from the IMU data.

The one or more processors can be configured to move the virtual avatar within a virtual environment in response to the motion of the limbs.

The plurality of IMUs can include a pair of foot-mounted IMUs, and the one or more processors can be configured to determine the activity type based on the IMU datasets from the pair of foot-mounted IMUs.

The plurality of IMUs can include at most 10 IMUs.

The plurality of IMUs can include a pair of underfoot IMUs, a pair of wrist-mounted IMUs, a sacrum-mounted IMU, a trunk-mounted IMU, a pair of thigh-mounted IMUs, and a pair of shank-mounted IMUs.

The one or more processors can be configured to generate the virtual avatar in the absence of any visual motion capture data.

The sensor data can consist entirely of sensor data collected from sensors mounted to the user's body.

The machine learning model can be trained using training data generated by collecting training sensor data and training motion capture data and calculating a training full-body posture using the training motion capture data.

The training sensor data and training motion capture data can be collected from one or more users while performing a plurality of specified activity types.

The training motion capture data from a given training user can be used to generate an initial training virtual avatar; and the initial training virtual avatar can be scaled using anthropometric measurement data for the given training user to generate a training virtual avatar.

The machine learning model can be trained by: calculating a training estimated full-body posture by inputting the training sensor data to the machine learning model; and optimizing the machine learning model based on a correlation between the training estimated full-body posture and the training full-body posture.

According to some aspects, there is provided a non-transitory computer readable medium storing computer-executable instructions, which, when executed by a computer processor, cause the computer processor to carry out a method of generating a virtual avatar representing a user using sensor data from a plurality of sensors mounted to the user. The method includes obtaining sensor data from the plurality of sensors, wherein the sensor data includes: force sensor data from a plurality of force sensors positioned underfoot of the user; and IMU data from a plurality of inertial measurement units (IMUs) mounted at respective IMU locations on the user, wherein the IMU data includes a plurality of IMU datasets, and each IMU dataset corresponds to one of the IMU locations; determining an activity type from the sensor data; determining an estimated full-body posture of the user by inputting the IMU data, force sensor data, and activity type to a machine learning model trained to estimate full-body posture, wherein the estimated full-body posture specifies a limb position and a limb orientation for each limb of the user; generating the virtual avatar based on the estimated full-body posture; and displaying the virtual avatar.

The non-transitory computer readable medium can store computer-executable instructions, which, when executed by a computer processor, cause the computer processor to carry out the method of generating a virtual avatar, where the method is described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
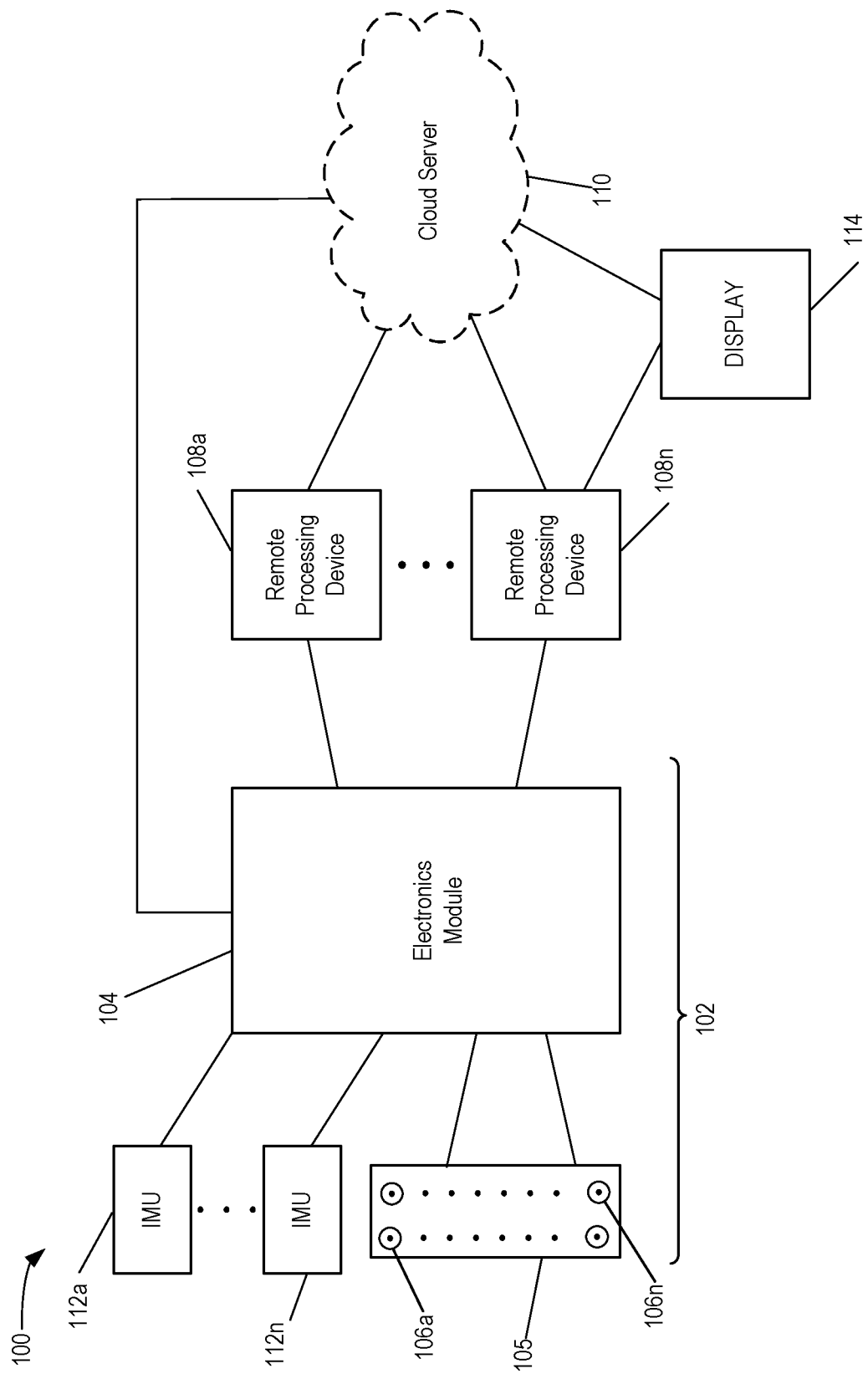
FIG. 1 is a block diagram illustrating an example of a system for generating a virtual avatar.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and devices for generating a virtual avatar representing an individual. A virtual avatar can be generated to represent an individual performing an activity or other movement. The systems, methods and devices described herein can determine an estimate of the individual's full-body posture using sensor readings from sensors mounted at various locations on the user's body. The sensors can include a plurality of force sensors positioned underfoot and a plurality of IMU sensors mounted at respective locations on the user's body. The systems, methods, and devices can in some examples use sensors attached to, or contained within, wearable devices to measure and monitor data relating to movement or activity of an individual. The measured data from the sensors can be used to estimate the full-body posture. The virtual avatar can then be generated based on the full-body posture.

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C, for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Traditionally, motion capture technology has been the only tool that can accurately measure body posture of individuals. Motion capture technology typically involves reflective markers positioned on an individual's body segments and multiple cameras positioned at different angles to identify the location of the reflective markers. The images obtained by the cameras are used to determine the user's body posture based on the location of the reflective markers. However, due to the associated equipment cost and sensitivity, the use of motion capture technology is typically restricted to controlled (usually laboratory) environments.

The present disclosure relates in general to a system, method, and device that can be used to determine a virtual avatar representing an individual partaking in an activity. The individual's full-body posture can be estimated using force sensor data and inertial measurement sensor data obtained from sensors mounted at various locations on the user's body. The sensor data can be input to a machine learning model trained to reproduce an estimate of a motion capture-measured full-body posture. The full-body posture can then be used to generate the virtual avatar representing the individual.

The systems, methods and devices described herein can be used to determine an estimated full-body posture using force sensor data from a plurality of force sensors positioned underfoot. Directly measuring the force (or pressure) applied by an individual using underfoot force sensors (as opposed to deriving the force data from other sensors such as accelerometers) can contribute to more accurate estimations of the user's full-body posture given the relationship between plantar pressure and body posture. As used herein, the term "force" is used broadly and can refer to raw force (i.e. with units of N), or pressure resulting from a raw force (i.e. with units of $N/m^2$).

The force sensors can be provided using various wearable devices, such as in the insole of a shoe or within the footwear worn by the individual. The force data acquired by the force sensors can be used to determine the level of force applied by an individual's foot when moving or performing activities such as walking, running, jumping, or cycling for example. This force data can be used to derive additional force derivatives or force-based metrics, such as the force output, mean force or the peak force for the individual.

The systems, methods and devices described herein can also include one or more inertial measurement units (IMUs). IMU data from the IMUs can be used as inputs to the machine learning model along with the force sensor data. These IMU-inputs can be provided to the machine learning model in conjunction with the force sensor inputs in order to determine the estimated full-body posture for the individual.

The force sensor data may support increased robustness in the prediction of the user's full-body posture. In particular, the force sensor data can allow the machine learning model to reflect the relationship between plantar pressure and body posture, which may reduce the need for additional IMUs.

As used herein, the term "body posture" refers to the position and orientation of an individual's body segments in three-dimensional space. An individual's body can be separated into a plurality of body segments. For instance, an individual's entire body may be represented using a head segment, at least one trunk segment (e.g. a whole trunk segment, an upper trunk segment, a middle trunk segment, and a lower trunk segment), respective upper arm segments, respective forearm segments, respective hand segments, respective thigh segments, respective shank segments, and respective foot segments.

Postural kinematics refers to the position, orientation, velocity, and acceleration of the body segments in three-dimensional space. The systems, methods and devices described herein can use the sensor data from the force sensors and IMUs to estimate full-body postural kinematics for an individual while performing an activity.

The estimated full-body postural kinematic data can be used to control the motion of a virtual avatar in a virtual environment. This may be useful for medical, fitness, athletic, security, entertainment or other purposes.

For example, the virtual avatar can be used in a gaming application. An individual may control the motion of their virtual avatar based on motions performed by the individual. The systems, methods and devices described herein may provide an individual with full-body avatar control that is proportional to human movement. This may provide for avatars whose appearances and movements are more accurate representations of their human users. The use of live human data to generate the avatar can contribute to a more realistic appearance and movement for avatars as compared to avatars created without live human data (or with limited human data).

More realistic avatar representation may also encourage greater uptake for gaming applications. For instance, some individuals experience motion sickness in virtual reality (VR) environments. Avatar movements that appear more realistic may help to minimize user motion sickness in VR.

Monitoring full-body posture and postural kinematics can also support feedback and analysis of individual performance. Estimated full-body posture data obtained from the machine learning model can be used to create avatars in a virtual world. Transferring the human body motion into qualitative observations can lead to an increased understanding of human biomechanics, particularly in relation to athletes and injury prevention. This may also help identify changes in user form or technique, e.g. by identifying changes in the virtual avatar between different activity sessions.

Real-time monitoring of individual postures and loading patterns can provide a user with real-time feedback on their performance. For example, real-time monitoring can provide a user with feedback on deviations from normal kinematic and kinetic ranges. This may also enable feedback indicative of how susceptible the user is to developing an injury.

The systems, methods and devices described herein can determine the user's full-body posture in the absence of motion capture reflectors or cameras. In particular, the user's full-body posture may be determined using solely force sensor data and IMU sensor data from sensors mounted on the user's body.

The sensors can be incorporated into wearable devices worn by the user. This allows the sensor data to be collected outside of controlled laboratory environments, allowing the user's full-body posture to be estimated for activities performed at different locations and in more natural environments.

In addition, the sensors can be integrated into wearable devices that are comfortable and typically imperceptible to the user. As a result, the sensors should not alter a user's normal movements, thus allowing more accurate postural data to be obtained.

Referring now to FIG. 1, shown therein is a block diagram illustrating an example system 100 that can be used to determine a user's full body posture. System 100 can also be used to generate a virtual avatar representing the user.

System 100 includes a plurality of sensors arranged to monitor an individual performing an activity or other type of movement. The sensors may be provided using one or more wearable devices.

System 100 includes an input unit 102 (also referred to herein as an input device), one or more processing devices 108 (also referred to herein as a receiving device or an output device), an optional remote cloud server 110 and a display 114. As will be described in further detail below, the input unit 102 may for example be combined with, or integrated into, carrier units such as wearable devices.

Input unit 102 generally includes a plurality of sensing units including at least one force sensing unit 105 and a plurality of inertial measurement units (IMUs) 112a-112n. Each sensing unit can be mounted at a respective location on the user's body (see e.g. FIGS. 3A-3B).

The example input unit 102 shown in FIG. 1 includes a plurality of sensing units coupled to a single electronics module 104. Alternatively, each sensing unit may be coupled to a separate electronics module.

Alternatively, multiple subsets of sensing units may be coupled to separate electronics modules.

In the example illustrated, the force sensing unit 105 and IMUs 112 are shown as separate sensing units. Alternatively or in addition, a combined sensing unit may be provided that includes both a force sensing unit 105 and an IMU 112. The combined sensing unit may simplify the collection of force sensor data and IMU data from the same location of the user's body.

Each force sensing unit 105 can include a plurality of force sensors 106a-106n. The plurality of force sensors 106a-106n can be positioned underfoot of an individual performing an activity or other type of movement. The force sensors 106 can be configured to collect force sensor data from underneath an individual's foot.

Each IMU 112 can include one or more sensors for measuring the position and/or motion of the wearable device. For example, IMU 112 may include sensors such as one or more of a gyroscope, accelerometer (e.g., a three-axis accelerometer), magnetometer, orientation sensor (for measuring orientation and/or changes in orientation), angular velocity sensor, and inclination sensor. Generally, IMU 112 includes at least an accelerometer. The IMU 112 also typically includes a gyroscope.

The carrier unit can be configured to position the sensors 106 in contact with (or in close proximity to) an individual's body to allow the sensors 106 to measure an aspect of the activity being performed by the individual. The plurality of sensors 106a-106n may be configured to measure a particular sensed variable at a location of an individual's body when the carrier unit is engaged with the individual's body (e.g. when the individual is wearing a wearable device containing the sensors 106). In system 100, the plurality of force sensors 106a-106n can be arranged to measure force underneath the foot (underfoot) of an individual.

In some examples, the carrier unit may include one or more wearable devices. The wearable devices can be manufactured of various materials such as fabric, cloth, polymer, or foam materials suitable for being worn close to, or in contact with, a user's skin. All or a portion of the wearable device may be made of breathable materials to increase comfort while a user is performing an activity.

In some examples, the wearable device may be formed into a garment or form of apparel such as a sock, a shoe, or an insole. Some wearable devices such as socks may be in direct contact with a user's skin. Some wearable devices, such as shoes, may not be in direct contact with a user's skin but still positioned within sufficient proximity to a user's body to allow the sensors to acquire the desired readings.

In some cases, the wearable device may be a compression-fit garment. The compression-fit garment may be manufactured from a material that is compressive. A compression-fit garment may minimize the impact from "motion artifacts" by reducing the relative movement of the wearable device with respect to a target location on the individual's body. In some cases, the wearable device may also include anti-slip components on the skin-facing surface. For example, a silicone grip may be provided on the skin-facing surface of the wearable device to further reduce the potential for motion artifacts.

The wearable device can be worn on a foot. For example, the wearable device may be a shoe, a sock, or an insole, or a portion of a shoe, a sock, or an insole. The wearable device may include a deformable material, such as foam. This may be particularly useful where the wearable device is a shoe or insole.

The plurality of force sensors 106a-106n and IMUs 112a-112n can be positioned to acquire sensor readings from specified locations on an individual's body (via the arrangement of the sensors on the carrier unit). The sensors 106 and/or IMUs 112 can be integrated into the material of the carrier unit (e.g. integrated into a wearable device or fitness equipment). Alternatively or in addition, the sensors 106 and/or IMUs 112 can be affixed or attached to the carrier unit, e.g. printed, glued, laminated or ironed onto a surface, or between layers, of a wearable device or fitness equipment.

For clarity, the below description relates to a carrier unit in the form of an insole. The insole carrier unit may be provided in various forms, such as an insert for footwear, or integrated into a shoe. However, other carrier units may be implemented using the systems and methods described herein, such as the wearable devices described above. Incorporating the sensing units (including force sensing unit 105 and IMUs 112) into a carrier unit in the form of a wearable device may be desirable as it allows an estimated full-body posture and postural kinematics to be determined for an individual at various locations and without requiring specifically configured fitness equipment.

The below description relates to an insole in which the plurality of sensors 106 are force sensors. Various types of force sensors may be used, such as force sensing resistors (also referred to as force sensing elements), pressure sensors, piezoelectric tactile sensors, elasto-resistive sensors, capacitive sensors or more generally any type of force sensor that can be integrated into a wearable device or fitness equipment capable of collecting force data underfoot.

The plurality of sensors 106 may be arranged into a sensor array. As used herein, the term sensor array refers to a series of sensors arranged in a defined grid. The plurality of sensors 106 can be arranged in various types of sensor arrays. For example, the plurality of sensors 106 can be provided as a set of discrete sensors (see e.g. FIG. 2). A discrete sensor is an individual sensor that acquires a sensor reading at a single location. A set of discrete sensors generally refers to multiple discrete sensors that are arranged in a spaced apart relationship in a sensing unit.

Sensors 106a-106n may be arranged in a sparse array of discrete sensors that includes void locations where no sensors 106 are located. Alternatively, sensors 106a-106n may be arranged in a continuous or dense sensor array in which sensors 106 are arranged in a continuous, or substantially continuous manner, across the grid.

Discrete sensors can provide an inexpensive alternative to dense sensor arrays for many applications. However, because no sensors are positioned in the interstitial locations between the discrete sensors and the void locations external to the set of discrete sensors, no actual sensors readings can be acquired for these locations. Accordingly, depending on the desired resolution for the force sensor data, sensor readings may be estimated (rather than measured) at the interstitial locations and at the void locations external to the set of discrete sensors in order to provide sensor data with similar resolution to a dense sensor array. Alternatively, where lower resolution force sensor data is sufficient, sensor readings may not necessarily be estimated.

Various interpolation and extrapolation techniques may be used to estimate sensor values at interstitial locations and external void locations. In some cases, sensor values may be estimated using the methods for synthesizing sensor data described in Applicant's co-pending patent application Ser. No. 17/988,468 filed on Nov. 16, 2022 entitled "SYSTEM AND METHOD FOR SYNTHESIZING SENSOR READINGS", the entirety of which is incorporated herein by reference.

System 100 can be configured to implement a method of determining an estimated full-body posture and generating a virtual avatar. The method of determining an estimated full-body posture and generating a virtual avatar may be implemented using one or more processors of the input device 102, a remote processing device 108, and/or cloud server 110.

As shown in FIG. 1, input unit 102 includes an electronics module 104 coupled to the plurality of sensors 106 and to IMUs 112. In some cases, the electronics module 104 can include a power supply, a controller, a memory, a signal acquisition unit operatively coupled to the controller and to the plurality of sensors 106 and to IMUs 112, and a wireless communication module operatively coupled to the controller.

Generally, the sensing unit refers to the plurality of sensors 106/112 and the signal acquisition unit. The signal acquisition unit may provide initial analog processing of signals acquired using the sensors 106 and 112, such as amplification. The signal acquisition unit may also include an analog-to-digital converter to convert the acquired signals from the continuous time domain to a discrete time domain. The analog-to-digital converter may then provide the digitized data to the controller for further analysis or for communication to a remote processing device 108 or remote cloud server 110 for further analysis.

Optionally, the electronics module 104 may include a controller or other processing device configured to perform the signal processing and analysis. In such cases, the controller on the electronics module may be configured to process the received sensor readings in order to determine sensor-derived data and/or an estimated full-body posture. In some cases, the controller may be coupled to the communication module (and thereby the sensing unit) using a wired connection such as Universal Serial Bus (USB) or other port.

The electronics module 104 can be communicatively coupled to one or more remote processing devices 108a-108n, e.g. using a wireless communication module (e.g., Bluetooth, Bluetooth Low-Energy, WiFi, ANT+ IEEE 802.11, etc.). The remote processing devices 108 can be any type of processing device such as (but not limited to) a personal computer, a tablet, and a mobile device such as a smartphone, a smartwatch or a wristband. The electronics modules 104 can also be communicatively coupled to remote cloud server 110 over, for example, a wide area network such as the Internet.

Each remote processing device 108 and optional remote cloud server 110 typically includes a processing unit, an output device (such as a display, speaker, and/or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit, and a memory unit. The memory unit can include RAM, ROM, one or more hard drives, one or more flash drives or some other suitable data storage elements such as disk drives, etc.

The processing unit controls the operation of the remote processing device 108 or the remote cloud server 110 and can be any suitable processor, controller or digital signal processor that can provide sufficient processing power depending on the desired configuration, purposes and requirements of the system 100.

The display 114 can be any suitable display that provides visual information. For instance, the display 114 can be a cathode ray tube, or a flat-screen monitor and the like if the remote processing device 108 or remote cloud server 110 is a desktop computer. In other cases, the display 114 can be a display suitable for a laptop, tablet or handheld device, such as an LCD-based display and the like. In still other cases, the display 114 can be a display suitable for a virtual-reality or augmented reality system, such as a virtual reality headset, smart glasses or smart goggles for example.

System 100 can generally be used for determining an estimated full-body posture based on sensor readings received from a plurality of force sensors positioned underfoot and a plurality of IMUs mounted at respective locations on a user's body. System 100 can also generate a virtual avatar using the full-body posture data. System 100 can also control motion of the virtual avatar based on the sensor readings from the force sensors and IMUs.

In some cases, system 100 may also track additional data derived from the sensor readings. The sensor readings, full-body posture data, postural kinematic data, virtual avatar and derived data may be monitored, stored, and analyzed for the user. Aspects of the monitoring, storage and analysis of biometric features and other metrics may be performed by one or more of the input unit 102, and/or a remote processing device 108, and/or the cloud server 110. For example, a non-transitory storage memory of one or more of the input unit 102, and/or a remote processing device 108, and/or the cloud server 110 can store a machine learning model trained to predict an estimated full-body posture.

A remote cloud server 110 may provide additional processing resources not available on the input unit 102 or the remote processing device 108. For example, some aspects of processing the sensor readings acquired by the sensors 106 may be delegated to the cloud server 110 to conserve power resources on the input unit 102 or remote processing device 108. In some cases, the cloud server 110, input unit 102 and remote processing device 108 may communicate in real-time to provide timely feedback to a user regarding the sensor readings, full-body posture data, postural kinematic data, avatar representation and other related data.

In the example system 100 illustrated in FIG. 1, a single input unit 102 is shown. However, system 100 may include multiple input units 102 associated with the same individual. For example, system 100 may include multiple separate input units 102, each input unit 102 associated with respective sensor locations on the user's body.

Figure 2:
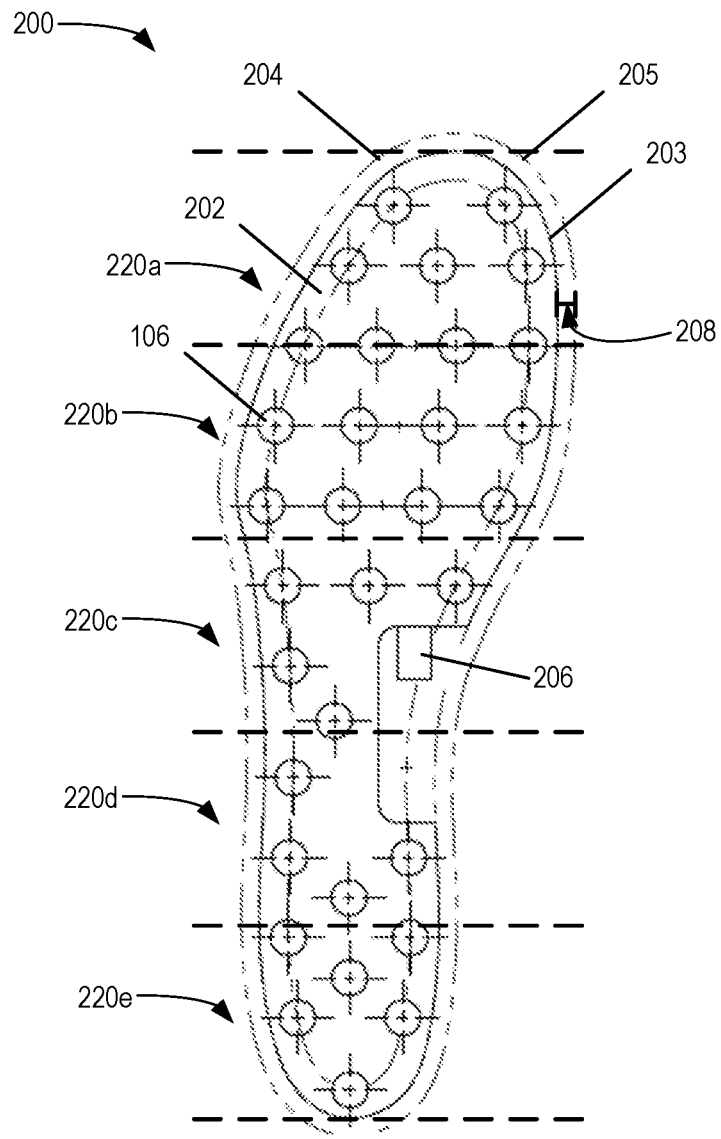
FIG. 2 is a diagram illustrating an example of a wearable device incorporating a sensing unit that can be used in the system of FIG. 1.

Referring now to FIG. 2, shown therein is an example of an insole 200 that includes a sensing unit 202. The insole 200 is an example of an input device 102 that may be used in the system 100 shown in FIG. 1. The insole 200 may be the footwear insert described in PCT Application No. PCT/CA2020/051520, the entirety of which is incorporated herein by reference.

The insole 200 includes a sensor unit 202 and an optional liner 204. The liner 204 can provide a protective surface between the sensor unit 202 and an individual's foot. The liner 204 may have a slightly larger profile as compared to the sensor unit 202. That is, the outer perimeter 203 of the sensor unit 202 may be inwardly spaced from the outer perimeter 205 of the liner 204 by an offset 208. The offset 208 may be substantially consistent throughout the perimeter of the sensor unit 202 such that the sensor unit 202 is completely covered by the liner 204.

Optionally, the sensor unit 202 can include an IMU (not shown). The sensor unit 202 can also include a connector 206. The connector 206 may provide a coupling interface between the plurality of sensors 106 (and the optional inertial measurement unit) and an electronics module (not shown) such as electronics module 104. The coupling interface can allow signals from the sensors 106 and/or IMU to be transmitted to the electronics module. In some cases, the coupling interface may also provide control or sampling signals from the electronics module to the sensors 106 and/or IMU.

The arrangement of sensors 106 in the sensor unit 202 is an example of a sparse sensor array that may be used to collect force sensor data. In alternative examples, various different types of force sensors, force sensor arrays, and arrangements of force sensors may be used. For example, sensor units containing a dense force sensor array (e.g. a Pedar® insole or Tekscan® system) may also be used.

Figure 3B:
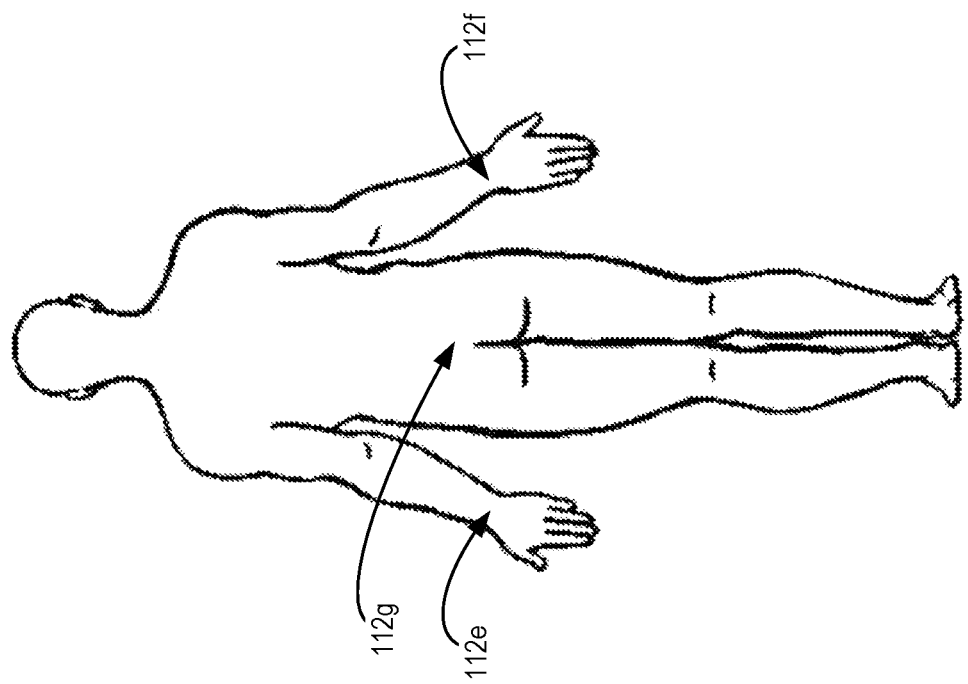
FIG. 3B is a diagram illustrating an example of sensing units mounted at various locations on the rear side of a user.
Figure 3A:
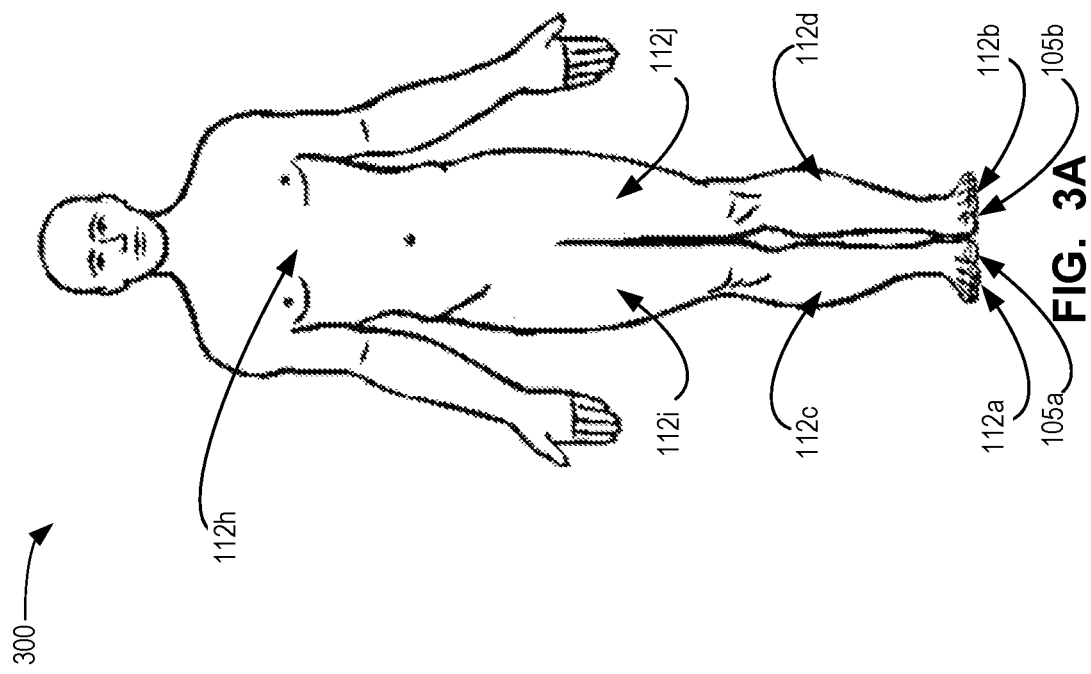
FIG. 3A is a diagram illustrating an example of sensing units mounted at various locations on the front side of a user.

Referring now to FIGS. 3A and 3B, shown therein is an illustration 300 of a user's body that includes an example arrangement of sensing units. As shown in FIG. 3A, a plurality of force sensing units 105 and IMUs 112 can be mounted at respective locations on the user's body.

As shown in the example of FIG. 3A, separate force sensing units 105a and 105b can be positioned underfoot of the respective feet of the user. The plurality of IMUs can also include at least one pair of foot-mounted IMUs. For example, a pair of underfoot IMUs 112a and 112b can be provided underfoot of the respective feet of the user. Optionally, the underfoot IMUs 112a and 112b can each be provided in a combined sensing unit with the corresponding force sensing units 105a and 105b.

Alternatively or in addition, a pair of shank-mounted IMUs 112c and 112d can be provided. Each shank-mounted IMU 112c and 112d can be mounted to the shank of a respective leg of the individual.

As shown in the example illustrated, the plurality of IMUs can also include a pair of wrist-mounted IMUs 112e and 112f. Each wrist-mounted IMU 112e and 112f can be mounted to the wrist of a respective arm of the individual.

As shown in the example illustrated, the plurality of IMUs can also include a sacrum-mounted IMU 112g.

As shown in the example illustrated, the plurality of IMUs can also include a trunk-mounted IMU 112h.

As shown in the example illustrated, the plurality of IMUs can also include a pair of thigh-mounted IMUs 112i and 112j. Each thigh-mounted IMU 112i and 112j can be mounted to the thigh of a respective leg of the individual.

Using force sensor data in combination with the IMU data can allow the user's full-body posture to be estimated more accurately while reducing the number of IMU locations required. In the example illustrated, the plurality of IMUs includes IMUs 112a-112j mounted at ten locations on the user's body. Optionally, the plurality of IMUs 112 can include at most 10 IMUs. This may allow the sensor data to be obtained from the user while limiting the impact on the user's movement.

Figure 4:
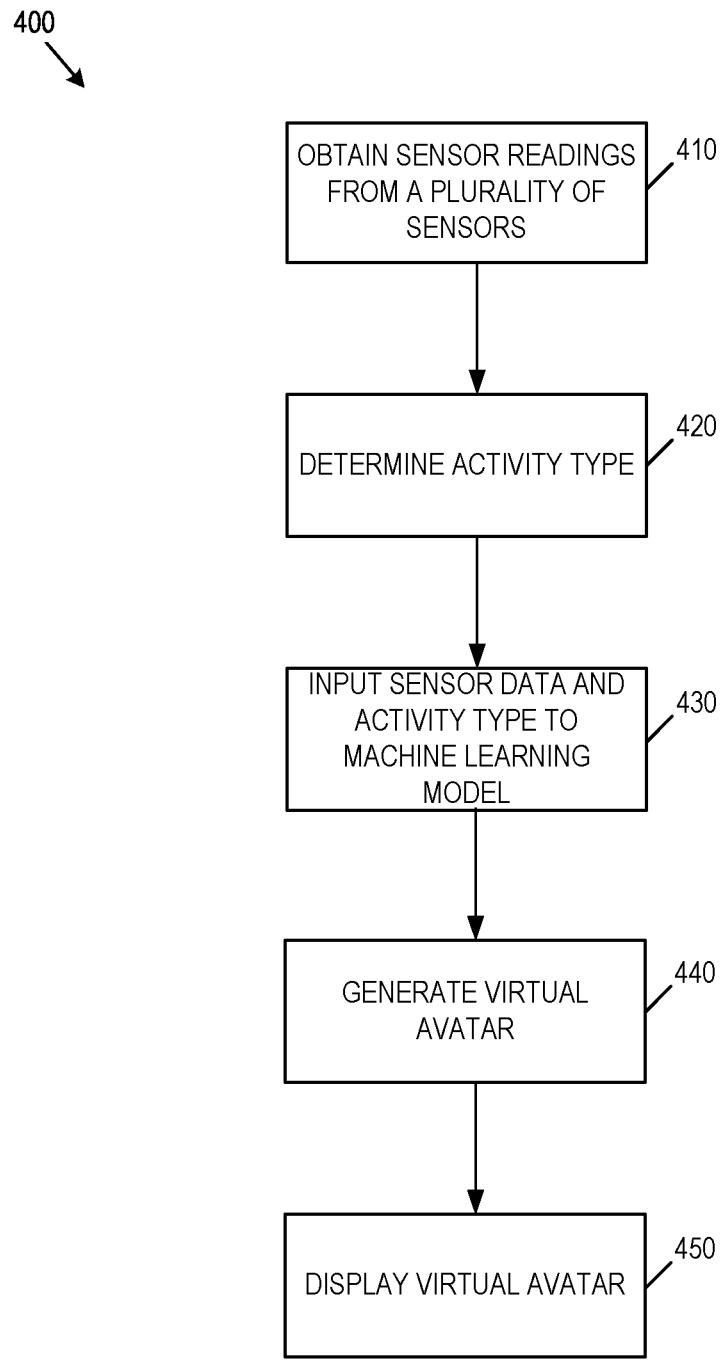
FIG. 4 is a flowchart illustrating an example of a method for generating a virtual avatar.

Referring now to FIG. 4, shown therein is an example method 400 for generating a virtual avatar representing a user. Method 400 can generate the virtual avatar based on sensor data from a plurality of sensors mounted to the user. The plurality of sensors can be sensors configured to measure human movement or human activity, such as force sensors 106 and IMUs 112. Aspects of method 400 may be performed by one or more of the input unit 102, and/or remote processing device 108, and/or cloud server 110.

Method 400 is an example of a method for generating a virtual avatar in which a machine learning model is used to estimate the user's full-body posture based on sensor readings acquired from the plurality of sensors. The full-body posture can then be used to generate the virtual avatar.

At 410, sensor data can be obtained from a corresponding plurality of sensors. The sensors can be mounted to the user at various locations on the user's body. For example, the plurality of sensors may be mounted to the user at the example sensor locations shown in FIGS. 3A and 3B.

The sensor data can include force sensor data obtained from a plurality of force sensors positioned underfoot of the user. The force sensors can be positioned at specified locations on a carrier unit such as a wearable device. The force sensors can be configured to measure force data relating to human activity. As shown in FIG. 2, the plurality of sensors may be force sensors provided at various locations of an insole. The force sensors can measure force applied to the insole during physical activities, such as walking, running, jumping, or cycling for example.

The sensor data can also include IMU data from a plurality of inertial measurement units (IMUs) mounted at respective IMU locations on the user. The IMU data can include a plurality of IMU datasets. Each IMU dataset corresponds to one of the IMU locations on the user.

The sensor readings acquired at 410 may be acquired as a time-continuous set of sensor readings. This may provide a time-continuous set of sensor data that can be used to determine the estimated full-body posture as a time-continuous posture. Depending on the nature of the sensors and the signal preprocessing performed, the time-continuous sensor data may be discretized, e.g. using an analog to digital conversion process. Even where the sensor data is discretized, the set of sensor data may allow the full-body posture to be determined as a (discretized) time-continuous posture.

The sensor data can consist entirely of sensor data collected from sensors mounted to the user's body. That is, the sensor data obtained at 410 can exclude or omit data captured by traditional motion capture systems (e.g. image or video data relating to the position of reflective markers on a user's body).

At 420, an activity type can be determined from the sensor data obtained at 410. The sensor readings may be acquired at 410 while an individual is taking part in various types of activities such as walking, running, cycling, jumping, dancing, golfing, snowboarding, etc.

At 420, the particular activity type in which an individual is partaking can be determined using the sensor data. An activity classification method can be applied to the sensor data to determine the corresponding activity type being performed (e.g. running, cycling, etc.).

For example, an activity type machine learning model (e.g. a neural network) can be trained to distinguish between different activities based on IMU data received from the plurality of IMUs 112. Optionally, the activity type machine learning model can be trained to determine the activity type based on IMU data solely from IMUs positioned underfoot of a user (e.g. IMUs 112a and 112b shown in FIG. 3A).

An example of an activity classification method that may be used to classify the sensor data is described in U.S. Pat. No. 11,526,749 entitled "METHOD AND SYSTEM FOR ACTIVITY CLASSIFICATION", the entirety of which is incorporated herein by reference.

At 430, the sensor data from 410 and activity type 420 can be provided as inputs to a machine learning model. The machine learning model can be trained to estimate a full-body posture in response to receiving sensor data and activity type as inputs.

The user's full-body posture can be determined by inputting the IMU data, force sensor data, and activity type to the machine learning model. The estimated full-body posture can be defined to specify a limb position and a limb orientation for each limb of the user.

The machine learning model can be trained to output the time-continuous full-body posture based on the force sensor data, IMU data, and activity type corresponding to each point in time or time step within a sensor dataset.

Various different types of machine learning models may be used to determine the estimated full-body posture. For example, a deep learning neural network model may be used to determine the full-body posture.

Alternatively, a different type of machine learning could be used to determine the estimated full-body posture, such as, for example a neural network, a gradient boosted decision tree, a support vector machine and so on.

The machine learning model can be trained using training data that includes the set of inputs (e.g. training force sensor data, training IMU data and a training activity type) determined from the sensor data. The inputs can be determined by collecting training sensor data from a plurality of force sensors positioned underfoot and a plurality of IMUs (as at 410) and determination of the activity type (e.g. using an activity classification method as at 420). The training sensor data can be obtained while sensors are mounted at respective locations on a user's body, such as the example locations shown in FIG. 3A.

The training data can also include training motion capture data. The training motion capture data can be determined by collecting motion capture data from the user concurrently with collecting the training sensor data. Motion capture reflective markers can be positioned along the training users' bodies, e.g. a minimum of four markers per body segment. Training motion capture data can then be collected using cameras arranged to surround the user. The training motion capture data and training sensor data can be collected while each individual performs one or more specified activity types.

Optionally, the training sensor data can also include force plate data in addition to the training force sensor data and training IMU data. For example, a training user may perform specified activity types using a force-instrumented treadmill or fitness mat that includes force-plates. The force plate data may be used to validate the training force sensor data.

The training data can be collected from one or more individuals performing one or more specified activity types. For example, the training data can be collected from one or more users while performing a plurality of specified activity types. Once the machine learning model is trained using the training data, the machine learning model can be applied to determine the estimated full-body posture of the same or different individuals performing an activity.

The training motion capture data can be used to determine a training body posture for a given user. The training body posture can specify a time-dependent position and orientation of each body segment for the given user. The training body posture can be defined as the desired output for the machine learning model.

Optionally, the training motion capture data from a given training user can be used to generate an initial training virtual avatar. The initial training virtual avatar can be defined as a postural template that includes the plurality of body segments for which posture is being determined. The postural template can then be scaled using anthropometric measurement data for the given training user to generate the training virtual avatar.

Anthropometric measurement data, such as height and weight, can be collected for each training user. For example, anthropometric measurement data may be provided manually by a user inputting the measurement data to a computing device, e.g. through a mobile application. Alternatively or in addition, anthropometric measurement data may be obtained using an automated or semi-automated measurement system. For example, anthropometric measurement data such as height and limb lengths can be obtained using a measurement mobile application that can determine various measurement data from an image or video captured of a training user (e.g. by a camera on the training user's mobile device). The training virtual avatar can be defined using the position and orientation of the body segments in the postural template (as determined from the training motion capture data) and the anthropometric measurements for the user.

The machine learning model can then be trained by inputting the training sensor data (the training force sensor data, training IMU data, and training activity type data) to the machine learning model in order to calculate a training estimated full-body posture. A correlation between the training estimated full-body posture and the training full-body posture (determined from the motion capture data) can then be determined. The machine learning model can then be optimized to maximize the correlation between the training estimated full-body posture and the training full-body posture.

Various different types of optimization algorithms can be used to train the machine learning model. For example, a cost function may be defined based on the difference between the desired output (i.e. the training full-body posture determined from the motion capture data) and the model outputs calculated from the given inputs. The optimization algorithm can be applied to adjust the parameters of the model in order to minimize the cost function or improve the correlation.

Different combinations of input data may be used to train and implement the machine learning model. For example, the machine learning model may be trained to receive input force sensor datasets from underneath each user's foot, IMU datasets from respective locations on the user's body, and a determined activity type.

Alternatively, a different number of inputs may be used. For example, a different number of inputs may be used when a different number of IMUs 112 are mounted to a user's body. For example, a user may be equipped with a head-mounted IMU 112. This may be desirable, for instance, where the user is wearing a virtual reality headset in order to participate in an activity involving their virtual avatar. The virtual reality headset can be equipped with an IMU.

Optionally, a plurality of alternative machine learning models can be trained using different combinations of IMU locations for a user. This may provide users with flexibility in determining full-body posture and generating a virtual avatar depending on the number and type of IMU sensors available to the user. The alternative machine learning model configurations may also allow users to select different configurations based on trade-offs between model accuracy and computation complexity.

Alternatively or in addition, a different number of inputs can be used where additional inputs (e.g. force sensor-derived data, IMU-derived data such as foot angle, acceleration, etc. and/or force sensor-derived data such as ground reaction force(s), center of pressure, plantar pressure, etc. and/or combined IMU and force sensor-derived metrics) are included in addition to the example inputs described herein above.

Alternatively or in addition, some of the inputs may be adjusted or modified. For example, force sensor data may be separated into a plurality of foot regions. Force sensor-derived data and/or IMU-derived data may be used in place of the input force sensor datasets and/or IMU datasets respectively.

At 440, a virtual avatar can be generated based on the estimated full-body posture determined at 430. The virtual avatar can be defined to provide a visual representation of the user within a virtual environment.

A plurality of skeletal lines can be determined to represent the body segments of the user. The plurality of skeletal lines can define a full-body skeletal outline for the user's body. The plurality of skeletal lines can be determined using the full-body posture from 430. The virtual avatar can then be generated from the plurality of skeletal lines.

For example, an avatar base template can be determined from the plurality of skeletal lines. The avatar base template can define the relative position and orientation of the limb segments of the virtual avatar. The avatar base template can then be scaled using anthropometric measurement data (e.g. height, weight, body segment length, body segment girth) for the corresponding user in order to generate the virtual avatar. The anthropometric measurement data for the corresponding user can be obtained in various ways, as described above with reference to obtaining the anthropometric measurement data for training users. For instance, anthropometric measurement data may be input manually by the corresponding user and/or obtained through an automated or semi-automated application on a computing device.

For example, a height of the avatar base template can be scaled based on user height data associated with the corresponding user. Avatar features can also be scaled and filled out based on anthropometric measurement data such as the weight of the user.

Optionally, the virtual avatar can be generated as a 1:1 representation of the user's anthropometric measurement data. Alternatively, a different scaling factor may be used.

As explained at 410, the sensor data can consist entirely of sensor data collected from sensors mounted to the user's body. That is, the sensor data used to generate the virtual avatar can omit any visual motion capture data for the user. Accordingly, the avatar at 440 can be generated in the absence of any visual motion capture data. This allows the user greater flexibility to perform activities at different locations while still generating a corresponding virtual avatar.

The motion of the limbs of the user can be determined using the sensor data obtained at 410. For example, the limb motion can be determined based on limb velocity data and acceleration data from the IMU data obtained at 410. Using the limb position and orientation (i.e. full-body posture) determined at 430 and the limb velocity data and acceleration data from the IMU data obtained at 410, full-body postural kinematic data can be determined for the user.

At 450, the virtual avatar from 440 can be displayed. The virtual avatar can be displayed within a virtual environment, for instance using display 114.

Displaying the virtual avatar within a virtual environment may allow the user to control a corresponding avatar within a video game or other interactive activity. Alternatively or in addition, displaying the virtual avatar may allow the user's posture and movements to be monitored and analyzed, e.g. for feedback on athletic performance and/or risk of injury.

The virtual avatar can also be moved within the virtual environment using the sensor data obtained at 410. For instance, the virtual avatar can be moved in response to the motion of the limbs of the user (e.g. as determined from the limb velocity data and acceleration data from the IMU data obtained at 410).

Optionally, the avatar motion can be a 1:1 representation of the user's motion data (i.e. limb velocity and limb acceleration data). Alternatively, a different proportion could be used (e.g. the virtual avatar could be moved at twice the speed of the human user). In addition, the relative scaling factor used for the avatar motion and the scaling user for the size of the avatar need not be the same.

One or more of steps 420-450 may be performed in real-time (e.g. substantially coincident with the collection of the data at 410) or at a different time from the collection of the data at 410.

For real-time applications, the sensor data can be provided immediately to a processing device capable of calculating the full-body posture and generating a virtual avatar using the full-body posture. This may be particularly desirable for gaming applications where the user's actions are intended to control the corresponding avatar in real-time.

Alternatively or in addition, the sensor data can be stored for later retrieval, analysis and generation of a virtual avatar.

For example, a user can cycle on a stationary bike and watch their virtual avatar cycle with them in real-time on a VR headset or other display. The user may also replay the virtual avatar cycling at a later time. Alternatively, the user can go for an outdoor bike ride and can come home and watch the avatar cycle on their television later in the day or another day.

Displaying a user's virtual avatar may also provide a useful tool for improving athletic performance and reducing risk of injury, both in real-time and post-activity analysis. Virtual avatars from different activity sessions (e.g. last week's runs vs. today's run) or different users can be compared to visualize differences in performance and to understand how differences or changes in technique improve or deteriorate performance and risk of injury.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application. Applicant hereby rescinds and retracts such disclaimer. Applicant also respectfully submits that any prior art previously considered in any related patent applications or patents, including any parent, sibling, or child, may need to be re-visited.

We claim:

1. A method of generating a virtual avatar representing a user using sensor data from a plurality of sensors mounted to the user, the method comprising:
   obtaining sensor data from the plurality of sensors, wherein the sensor data includes:
      force sensor data from a plurality of force sensors positioned underfoot of the user; and
      IMU data from a plurality of inertial measurement units (IMUs) mounted at respective IMU locations on the user, wherein the IMU data includes a plurality of IMU datasets, and each IMU dataset corresponds to one of the IMU locations;
   determining an activity type from the sensor data;
   determining an estimated full-body posture of the user by inputting the IMU data, force sensor data, and activity type to a machine learning model trained to estimate full-body posture, wherein the estimated full-body posture specifies a limb position and a limb orientation for each limb of the user;
   generating the virtual avatar based on the estimated full-body posture, wherein generating the virtual avatar comprises:
      determining a plurality of skeletal lines representing the limbs of the user based on the estimated full-body posture;
      generating an avatar base template from the plurality of skeletal lines; and scaling the avatar base template using anthropometric measurement data for the user to generate the virtual avatar; and displaying the virtual avatar.

2. The method of claim 1, further comprising determining motion of the limbs of the user based on limb velocity data and acceleration data from the IMU data.

3. The method of claim 2, further comprising moving the virtual avatar within a virtual environment in response to the motion of the limbs.

4. The method of claim 1, wherein the plurality of IMUs includes a pair of foot-mounted IMUs, and the activity type is determined based on the IMU datasets from the pair of foot-mounted IMUs.

5. The method of claim 1, wherein the machine learning model is trained using training data generated by collecting training sensor data and training motion capture data and calculating a training full-body posture using the training motion capture data.

6. The method of claim 5, wherein the training sensor data and training motion capture data is collected from one or more users while performing a plurality of specified activity types.

7. The method of claim 5, wherein:
the training motion capture data from a given training user is used to generate an initial training virtual avatar; and
the initial training virtual avatar is scaled using anthropometric measurement data for the given training user to generate a training virtual avatar.

8. The method of claim 5, wherein the machine learning model is trained by:
calculating a training estimated full-body posture by inputting the training sensor data to the machine learning model; and
optimizing the machine learning model based on a correlation between the training estimated full-body posture and the training full-body posture.

9. A system for generating a virtual avatar representing a user, the system comprising:
a plurality of sensors mountable to the user, the plurality of sensors including a plurality of force sensors positionable underfoot of the user and a plurality of inertial measurement units (IMUs) mountable at respective IMU locations on the user;
one or more processors communicatively coupled to the plurality of sensors; and
a non-transitory storage memory storing a machine learning model trained to estimate a full-body posture of the user;
wherein the one or more processors is configured to:
obtain sensor data from the plurality of sensors, wherein the sensor data includes:
force sensor data from the plurality of force sensors; and
IMU data from the plurality of inertial measurement units (IMUs),
wherein the IMU data includes a plurality of IMU datasets, and each IMU dataset corresponds to one of the IMU locations;
determine an activity type from the sensor data;
determine an estimated full-body posture by inputting the IMU data, force sensor data, and activity type to the machine learning model, wherein the estimated full-body posture specifies a limb position and a limb orientation for each limb of the user;
generate the virtual avatar based on the estimated full-body posture, wherein the one or more processors is configured to generate the virtual avatar by:
determining a plurality of skeletal lines representing the limbs of the user based on the estimated full-body posture;
generating an avatar base template from the plurality of skeletal lines; and
scaling the avatar base template using anthropometric measurement data for the user to generate the virtual avatar; and
display the virtual avatar.

10. The system of claim 9, wherein the one or more processors is configured to determine motion of the limbs of the user based on limb velocity data and acceleration data from the IMU data.

11. The system of claim 10, wherein the one or more processors is configured to move the virtual avatar within a virtual environment in response to the motion of the limbs.

12. The system of claim 9, wherein the plurality of IMUs includes a pair of foot-mounted IMUs, and the one or more processors is configured to determine the activity type based on the IMU datasets from the pair of foot-mounted IMUs.

13. The system of claim 9, wherein the machine learning model is trained using training data generated by collecting training sensor data and training motion capture data and calculating a training full-body posture using the training motion capture data.

14. The system of claim 13, wherein the training sensor data and training motion capture data is collected from one or more users while performing a plurality of specified activity types.

15. The system of claim 13, wherein:
the training motion capture data from a given training user is used to generate an initial training virtual avatar; and
the initial training virtual avatar is scaled using anthropometric measurement data for the given training user to generate a training virtual avatar.

16. The system of claim 13, wherein the machine learning model is trained by:
calculating a training estimated full-body posture by inputting the training sensor data to the machine learning model; and
optimizing the machine learning model based on a correlation between the training estimated full-body posture and the training full-body posture.

* * * * *